(12) United States Patent
Kim et al.

(10) Patent No.: US 9,187,637 B2
(45) Date of Patent: Nov. 17, 2015

(54) THERMO-SHRINKABLE POLYESTER FILM

(75) Inventors: Yun Jo Kim, Gumi-si (KR); Chan Seok Yoon, Busan (KR); Sung Ho Lee, Gumi-si (KR); Si Min Kim, Daegu (KR)

(73) Assignee: KOLON INDUSTRIES, INC., Gwacheon-si (KR)

( * ) Notice: Subject to any disclaimer, the term of this patent is extended or adjusted under 35 U.S.C. 154(b) by 1436 days.

(21) Appl. No.: 12/743,536

(22) PCT Filed: Nov. 19, 2008

(86) PCT No.: PCT/KR2008/006809
§ 371 (c)(1),
(2), (4) Date: Mar. 9, 2011

(87) PCT Pub. No.: WO2009/066928
PCT Pub. Date: May 28, 2009

(65) Prior Publication Data
US 2011/0172386 A1    Jul. 14, 2011

(30) Foreign Application Priority Data

Nov. 19, 2007  (KR) .................. 10-2007-0117732
Nov. 22, 2007  (KR) .................. 10-2007-0119476
Dec. 11, 2007  (KR) .................. 10-2007-0128381
Nov. 19, 2008  (KR) .................. 10-2008-0115007
Nov. 19, 2008  (KR) .................. 10-2008-0115008
Nov. 19, 2008  (KR) .................. 10-2008-0115009

(51) Int. Cl.
*C08G 63/12* (2006.01)
*C08G 63/123* (2006.01)
(Continued)

(52) U.S. Cl.
CPC .............. *C08L 67/02* (2013.01); *B29C 55/08* (2013.01); *B29C 61/003* (2013.01); *C08J 5/18* (2013.01); *B29C 47/0021* (2013.01); *B29C 47/0057* (2013.01); *B29C 55/005* (2013.01); *B29C 55/02* (2013.01); *B29C 55/04* (2013.01); *B29C 55/10* (2013.01); *B29C 55/12* (2013.01); *B29D 7/01* (2013.01); *B29K 2067/00* (2013.01); *B29K 2995/0049* (2013.01); *B32B 27/36* (2013.01); *B32B 2307/514* (2013.01); *B32B 2307/516* (2013.01); *B32B 2307/736* (2013.01); *B32B 2367/00* (2013.01); *C08G 63/12* (2013.01); *C08G 63/123* (2013.01); *C08G 63/127* (2013.01); *C08G 63/13* (2013.01); *C08G 63/137* (2013.01); *C08G 63/16* (2013.01); *C08G 63/18* (2013.01); *C08G 63/181* (2013.01); *C08G 63/183* (2013.01); *C08G 63/189* (2013.01); *C08G 63/199* (2013.01); *C08J 2367/02* (2013.01); *C08L 67/03* (2013.01)

(58) Field of Classification Search
None
See application file for complete search history.

(56) References Cited

U.S. PATENT DOCUMENTS 4,042,565 A * 8/1977 Hoheisel et al. ............. 528/195
5,407,752 A * 4/1995 Fukuzumi et al. ........... 428/480
(Continued)

FOREIGN PATENT DOCUMENTS

JP   04-335041   * 11/1992
JP   08-323859   * 12/1996
(Continued)

*Primary Examiner* — Vivian Chen
(74) *Attorney, Agent, or Firm* — Sughrue Mion, PLLC

(57) ABSTRACT

Disclosed is a thermo-shrinkable polyester film in which shrinkage uniformity is ensured in a shrinking process thus realizing superior quality of the outer appearance without causing a poorly printed state, reducing the production cost of the shrinking process and improving the productivity.

30 Claims, 2 Drawing Sheets

(51) Int. Cl.

| | |
|---|---|
| *C08G 63/127* | (2006.01) |
| *C08G 63/13* | (2006.01) |
| *C08G 63/137* | (2006.01) |
| *C08G 63/16* | (2006.01) |
| *C08G 63/18* | (2006.01) |
| *C08G 63/181* | (2006.01) |
| *C08G 63/183* | (2006.01) |
| *C08G 63/189* | (2006.01) |
| *C08G 63/199* | (2006.01) |
| *C08L 67/02* | (2006.01) |
| *C08L 67/03* | (2006.01) |
| *B32B 27/36* | (2006.01) |
| *B29C 55/02* | (2006.01) |
| *B29C 55/04* | (2006.01) |
| *B29C 55/10* | (2006.01) |
| *B29C 55/12* | (2006.01) |
| *B29D 7/01* | (2006.01) |
| *B29C 55/08* | (2006.01) |
| *B29C 61/00* | (2006.01) |
| *C08J 5/18* | (2006.01) |
| *B29C 47/00* | (2006.01) |
| *B29C 55/00* | (2006.01) |
| *B29K 67/00* | (2006.01) |

(56) References Cited

U.S. PATENT DOCUMENTS

| | | | | |
|---|---|---|---|---|
| 5,589,126 | A | * | 12/1996 | Shih et al. .................... 264/211 |
| 5,824,398 | A | * | 10/1998 | Shih ........................... 428/195.1 |
| 6,231,958 | B1 | | 5/2001 | Kim et al. |
| 6,599,994 | B2 | * | 7/2003 | Shelby et al. ................. 525/444 |
| 7,128,863 | B2 | | 10/2006 | Kim et al. |

FOREIGN PATENT DOCUMENTS

| | | | |
|---|---|---|---|
| JP | 09-174684 | * | 7/1997 |
| JP | 09-254257 | * | 9/1997 |
| JP | 09-254257 A | | 9/1997 |
| KR | 10-2000-0074723 A | | 12/2000 |
| KR | 10-2001-0011259 A | | 2/2001 |
| KR | 10-2005-0000141 A | | 1/2005 |
| KR | 10-2006-0003948 A | | 1/2006 |

* cited by examiner

THERMO-SHRINKABLE POLYESTER FILM

TECHNICAL FIELD

The present invention relates to a polyester film having thermal shrinkage properties.

BACKGROUND ART

A thermo-shrinkable film is used as packing material or labels for coating, binding or wrapping various containers including bottles, cans or the like, and longish objects including pipes, rods and so on, and is composed mainly of polyester.

A thermo-shrinkable film is employed for shrink (accumulative) packaging, shrink labeling and cap sealing various containers including, for example, polyethyleneterephthalte (PET) containers, polyethylene containers, glass containers and so on, using heat shrinkability thereof.

In order to manufacture a label or the like, polymer material is continuously melted and extruded, thus preparing an unstretched film, which is then stretched to give a thermo-shrinkable film roll. The film in the roll is unwound, slit into a desired width, and then rewound into the roll. Subsequently, various characters and figures, including a product name and the like, are printed on the resulting film. After the completion of printing, the film is folded and bonded along both edges by means of, for example, solvent adhesion, to give a tubular film (in a tubing process). As such, there are cases where the sequence of the slitting process and the printing process is reversed. The tubular film thus obtained may be rewound into another roll and then unwound in subsequent procedures so that it is cut into tubular labels of a desired length, which are then further converted into bags through bonding along an edge of one opening thereof.

Subsequently, a container is clothed in the label or bag, passed, for example on a belt conveyer, through a shrinking tunnel (steam tunnel) wherein heated steam is blown for thermal shrinkage or a shrinking tunnel (hot-air tunnel) wherein hot air is blown, to give a final product (a labeled container) having the label or bag tightly attached thereto.

In the manufacture of the product using the thermo-shrinkable film, subsequent procedures after the formation of the film, for example, the printing process, the process of passing the container clothed in the label or bag through the shrinking tunnel, etc., are accompanied by a predetermined heat. In particular, the shrinking process which is finally performed is accompanied by heat regardless of the heating means such as steam or hot air, and thus may incur damage to the label or result in a poorly printed state and may also change the properties of the film. Thereby, the label may have a weaker resistance to impact, resulting in lowered product reliability.

During the shrinking process using the steam tunnel or the hot-air tunnel, steam or hot air is blown from the inlet of the tunnel to the outlet of the tunnel, but both ends and the center of the tunnel are not uniform in temperature. In this way, when the temperature in the tunnel is not uniform, the degree of shrinkage of the label may vary slightly.

After the shrinking process using the shrinking tunnel or the hot-air tunnel, the label should be uniformly shrunk so as to be tightly attached to the container. Actually, however, the label may be warped or the shape thereof may be lost.

This phenomenon occurs because the label or the like is not uniformly shrunk for a predetermined period of time at a given temperature. The difference in the degree of shrinkage, namely, the non-uniformity of shrinkage, causes a defective outer appearance of the label, and in severe cases, a poorly printed state may result.

The non-uniformity of shrinkage may retard the shrinking process and may reduce the productivity.

DISCLOSURE

Technical Problem

Accordingly, the present invention provides a thermo-shrinkable polyester film, which is capable of being shrunk at low temperature when external heat is applied, thus minimizing damage to the film due to heat.

In addition, the present invention provides a thermo-shrinkable polyester film, in which the temperature required to achieve a maximum shrinkage ratio is lowered, thus preventing damage to a label and a printed state and the deterioration of the properties of the film due to heat.

In addition, the present invention provides a thermo-shrinkable polyester film, which has an improved deformation percentage depending on the change in temperature in a main shrinking direction (i.e. a transverse direction (TD)).

In addition, the present invention provides a thermo-shrinkable polyester film, which is improved in a rate of shrinkage deformation depending on the change in temperature in a main shrinking direction (i.e. TD) and in which maximum shrinkage deformation occurs at low temperature, thus enabling uniform shrinkage within a predetermined temperature range.

In addition, the present invention provides a thermo-shrinkable polyester film which has a uniform shrinkage ratio with respect to time at a predetermined temperature.

In addition, the present invention provides a thermo-shrinkable polyester film, which is capable of ensuring the quality of a printed state after the shrinking process thanks to shrinkage uniformity and also of improving productivity.

Technical Solution

According to an embodiment of the present invention, there is provided a thermo-shrinkable polyester film having a shrinkage starting temperature of 72~88° C. in a main shrinking direction, in which the shrinkage starting temperature is defined as, on a graph of shrinkage stress versus temperature obtained by measuring stress of a film which is held under conditions of room temperature and a predetermined initial load (0.125 Kg/mm$^2$) and is shrunk due to application of heat thereto at a predetermined heating rate (2.5° C./sec), the first temperature showing shrinkage stress having a value equal to the initial load.

According to another embodiment of the present invention, there is provided a thermo-shrinkable polyester film having a velocity of shrinkage of 0.5~3.5%/° C. in a main shrinking direction (i.e. TD), as represented by Equation 1 below.

$$\text{Velocity of Shrinkage} = \Delta L / \Delta T \quad \text{Equation 1}$$

wherein the equation is obtained by measuring dimension changes of a sample due to expansion and shrinkage depending on changes in temperature using a linear variable differential transformer (LVDT), in which $\Delta T$ is a change in temperature and $\Delta L$ is a deformation percentage in a main shrinking direction (i.e. TD), in a temperature range of 70~85° C.

According to a further embodiment of the present invention, there is provided a thermo-shrinkable polyester film having a rate of change of shrinkage ratio of 4.0~10.0%/sec in a main shrinking direction with respect to time within 5 sec at 95° C. upon measurement of thermal shrinkage-force in a predetermined longitudinal direction using a thermal stress tester.

According to a preferred embodiment of the present invention, there is provided a thermo-shrinkable polyester film having a velocity of shrinkage of 0.5~3.5%/° C. in a main shrinking direction (i.e. TD) as represented by Equation 1 below.

$$\text{Velocity of Shrinkage} = \Delta L/\Delta T \qquad \text{Equation 1}$$

wherein the equation is obtained by measuring dimension changes of a sample due to expansion and shrinkage depending on changes in temperature using an LVDT, in which $\Delta T$ is a change in temperature and $\Delta L$ is a deformation percentage in a main shrinking direction (i.e. TD), in a temperature range of 70~85° C.

According to another preferred embodiment of the present invention, there is provided a thermo-shrinkable polyester film having a rate of change of shrinkage ratio of 4.0~10.0%/sec in a main shrinking direction with time within 5 sec at 95° C. upon measurement of thermal shrinkage-force in a predetermined longitudinal direction using a thermal stress tester.

According to the embodiments of the present invention, the thermo-shrinkable polyester film may have a maximum shrinkage temperature of 85~100° C. in a main shrinking direction and a maximum shrinkage stress of 0.65~1.30 kg/mm² in a main shrinking direction, in which the maximum shrinkage temperature is defined as, on a graph of shrinkage stress versus temperature obtained by measuring stress of a film which is held under conditions of room temperature and a predetermined initial load (0.125 kg/mm²) and is shrunk due to application of heat thereto at a predetermined heating rate (2.5° C./sec), the first temperature showing the maximum shrinkage stress, and the maximum shrinkage stress is defined as the peak of the graph of shrinkage stress versus temperature obtained by measuring stress of a film which is held under conditions of room temperature and a predetermined initial load (0.125 kg/mm²) and is shrunk due to application of heat thereto at a predetermined heating rate (2.5° C./sec).

According to the embodiments of the present invention, the thermo-shrinkable polyester film may have a dynamic glass transition temperature of 90~100° C. in a main shrinking direction as measured through dynamic mechanical thermal analysis and an intrinsic viscosity of 0.60~0.70 dl/g.

According to the embodiments of the present invention, the thermo-shrinkable polyester film may have a rate of shrinkage deformation of 3.5~8.5 in a main shrinking direction (i.e. TD) as represented by Equation 2 below.

$$\text{Rate of Shrinkage Deformation} = dL/dT \qquad \text{Equation 2}$$

wherein this value is obtained by differentiating the deformation percentage in a main shrinking direction (i.e. TD) depending on the change in temperature in the temperature range of 30~90° C. as represented by Equation 1 showing dimension changes of a sample due to expansion and shrinkage depending on changes in temperature measured using an LVDT, and indicates a maximum rate of deformation in the temperature range.

As such, the temperature range in which the maximum rate of shrinkage deformation in a main shrinking direction (i.e. TD) is exhibited may be 80~88° C.

According to the embodiments of the present invention, the thermo-shrinkable polyester film may have a thermal shrinkage ratio of 60% or more (at 95° C., 10 sec, free state).

According to the embodiment of the present invention, the thermo-shrinkable polyester film may have the shrinkage stress of 0.6~1.3 kg/mm² in a main shrinking direction at 95° C.

According to the embodiments of the present invention, the thermo-shrinkable polyester film may be composed of at least one copolyester selected from among copolyesters prepared from a dicarboxylic acid component including one or more selected from among dicarboxylic acids including terephthalic acid, oxalic acid, malonic acid, succinic acid, adipic acid, suberic acid, azelaic acid, sebacic acid, phthalic acid, isophthalic acid, naphthalene dicarboxylic acid and diphenylether dicarboxylic acid, and from a diol component including one or more selected from among diols including ethyleneglycol, neopentylglycol, propyleneglycol, trimethyleneglycol, tetramethyleneglycol, hexamethyleneglycol, diethyleneglycol, polyalkyleneglycol and 1,4-cyclohexanedimethanol; or a mixture of homopolyester and copolyester. The copolyester may be composed of a dicarboxylic acid monomer including about 80 mol % or more of a terephthalic acid monomer and a diol monomer including about 14~24 mol % of a monomer other than ethyleneglycol.

In the thermo-shrinkable polyester film according to the embodiment of the present invention, the copolyester may have a glass transition temperature of 67~77° C. and an intrinsic viscosity of 0.60~0.70 dl/g.

In the thermo-shrinkable polyester film according to the embodiment of the present invention, the homopolyester may be polybutyleneterephthalate or polytriethyleneterephthalate.

In the thermo-shrinkable polyester film according to the embodiment of the present invention, the copolyester may be used in an amount of 85~93 wt % based on the total amount of the polyester.

The thermo-shrinkable polyester film according to the embodiment of the present invention may be manufactured by subjecting the polyester to extrusion at 200~350° C., preheating at 80~100° C. and then stretching in TD at 70~95° C. As such, the polyester which is extruded may be further stretched in a mechanical direction (MD) at a stretch ratio including a natural stretch ratio naturally occurring in MD and an additional 0.1~5%.

The thermo-shrinkable polyester film according to the embodiment of the present invention may be manufactured by subjecting the polyester to extrusion, preheating, stretching in TD and then heat treatment, wherein a temperature for the heat treatment is set to be lower than a temperature for the preheating.

As such, preheating may be performed at 80~100° C., and the heat treatment may be performed in a temperature range of from room temperature to 95° C.

According to still a further embodiment of the present invention, there is provided a method of manufacturing a thermo-shrinkable polyester film through extrusion and stretching of polyester, composed of extruding polyester at 200~350° C., thus obtaining an extruded polyester sheet; preheating the extruded polyester sheet at 80~100° C.; and stretching the polyester sheet in TD at 70~95° C., wherein the thermo-shrinkable polyester film has a shrinkage starting temperature of 72~88° C. in a main shrinking direction, in which the shrinkage starting temperature is defined as, on a graph of shrinkage stress versus temperature obtained by measuring stress of a film which is held under conditions of room temperature and a predetermined initial load (0.125 Kg/mm²) and is shrunk due to application of heat thereto at a predetermined heating rate (2.5° C./sec), the first temperature showing shrinkage stress having a value equal to the initial load.

According to yet another embodiment of the present invention, there is provided method of manufacturing a thermo-shrinkable polyester film through extrusion and stretching of polyester, composed of extruding polyester at 200~350° C., thus obtaining an extruded polyester sheet; preheating the extruded polyester sheet; stretching the polyester sheet; and heat treating the polyester sheet, wherein a temperature for the heat treating is set to be lower than that for the preheating, and the thermo-shrinkable polyester film has a velocity of shrinkage of 0.5~3.5%/° C. in a main shrinking direction (i.e. TD) as represented by Equation 1 below.

$$\text{Velocity of Shrinkage} = \Delta L / \Delta T \quad \text{Equation 1}$$

wherein the equation is obtained by measuring dimension changes of a sample due to expansion and shrinkage depending on changes in temperature using an LVDT, in which $\Delta T$ is a change in temperature and $\Delta L$ is a deformation percentage in a main shrinking direction (i.e. TD), in a temperature range of 70~85° C.

According to still another embodiment of the present invention, there is provided a method of manufacturing a thermo-shrinkable polyester film through extrusion and stretching of polyester, composed of extruding polyester at 200~350° C., thus obtaining an extruded polyester sheet; preheating the extruded polyester sheet; stretching the polyester sheet; and heat treating the polyester sheet, wherein a temperature for the heat treating is set to be lower than that for the preheating, and the thermo-shrinkable polyester film has a rate of change of shrinking ratio of 4.0~10.0%/sec in a main shrinking direction with time within 5 sec at 95° C. upon measurement of thermal shrinkage-force in a predetermined longitudinal direction using a thermal stress tester.

The method according to the embodiments of the present invention may further include stretching the polyester sheet in MD at a stretch ratio including a natural stretch ratio naturally occurring in MD and an additional 0.1~5%, after extruding the polyester.

In the method according to the embodiments of the present invention, preheating may be performed at 80~100° C., and heat treating may be performed in a temperature range of from room temperature to 95° C.

Advantageous Effects

According to an embodiment of the present invention, a thermo-shrinkable polyester film can be shrunk at low temperature, and thus can prevent damage to a label and a printed state and the deterioration of the properties of the film in a shrinking process which is finally performed. Also, the temperature required to reach the maximum shrinkage ratio of the film can be minimized, thus further preventing damage to a label and a printed state and the deterioration of properties and improving the process efficiency.

According to the embodiment of the present invention, the thermo-shrinkable polyester film can have a high rate of change of shrinkage ratio with respect to time at a predetermined temperature and thus can be uniformly shrunk within a short time, thereby reducing the generation of a non-uniformity of shrinkage during the shrinking process. Therefore, a defective outer appearance of the label can be improved upon and reduced, and a poorly printed state does not occur, resulting in increased productivity.

According to the embodiment of the present invention, the thermo-shrinkable polyester film can exhibit a uniform rate of shrinkage deformation when within a predetermined temperature range and can also be improved in velocity of shrinkage, and thus the generation of non-uniformity of shrinkage during the shrinking process can be reduced. Therefore, a defective outer appearance of label can be improved upon and reduced, and a poorly printed state does not occur, resulting in increased productivity.

BEST MODE

A shrinkable film is manufactured based on a principle in which low-temperature uniaxial stretching permits maximum uniaxial orientation and also relief of residual stress due to heat treatment is prevented so that a uniaxially oriented molecular chain retains such residual stress and then is shrunk by the force of the residual stress in the shrinking process which is finally performed.

A shrinkable polyester film is typically obtained by extruding a composition containing copolyester. As such, copolyester is problematic in that it has a particularly weak resistance to heat.

Attributable to the problem of the material, a thermo-shrinkable polyester film has low heat resistance.

According to an embodiment of the present invention, a thermo-shrinkable polyester film has a shrinkage starting temperature of 72~88° C. in a main shrinking direction, in which the shrinkage starting temperature is defined as, on a graph of shrinkage stress versus temperature obtained by measuring stress of a film which is held under conditions of room temperature and a predetermined initial load and is shrunk due to application of heat thereto at a predetermined heating rate, the first temperature showing shrinkage stress having a value equal to the initial load.

An example of the instrument used for measuring and obtaining the above graph may include a thermal stress tester.

In order to confirm the shrinking properties of the shrinkable film depending on the change in temperature in a thermal stress tester, while the film which is held under a predetermined load is heated at a predetermined heating rate, the change in stress by shrinkage depending on the change in temperature is measured.

Figure 1:
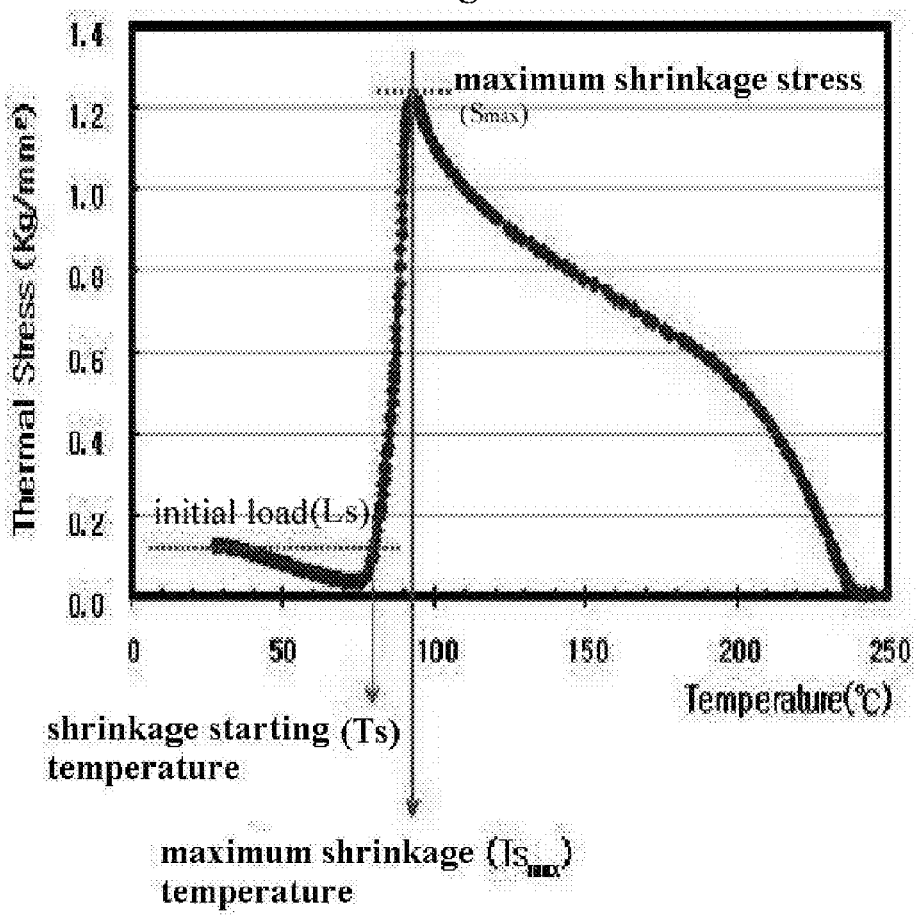
FIG. 1 is a graph showing the change in shrinkage stress of a thermo-shrinkable polyester film of Example 1 in a main shrinking direction depending on the change in temperature as measured using a thermal stress tester.

The graph thus measured is illustrated in FIG. 1. As shown in FIG. 1, the first point on the graph is a load Ls which is initially set. Upon heating, the film is initially softened and thus the stress is lower than the initial load Ls, and then, when the temperature reaches a predetermined temperature, the film begins to shrink while being tightened. At this time, the shrinkage stress having the value equal to the initial load Ls is observed, and the temperature at which such stress is observed is defined as the shrinkage starting temperature Ts.

The thermo-shrinkable polyester film according to the present invention has the shrinkage starting temperature of 72~88° C. in a main shrinking direction.

If the shrinkage starting temperature is lower than 72° C., dimensional stability against heat is decreased, and a printed label may be warped and thus the film is difficult to handle during printing and processing. In contrast, if the shrinkage starting temperature is higher than 88° C., long-term high-temperature treatment is required during the shrinking process, undesirably damaging the label and increasing the processing cost.

Also, the thermo-shrinkable polyester film according to the present invention is observed to have a maximum shrinkage temperature of 85~100° C. in a main shrinking direction. As such, on a graph of shrinkage stress versus temperature obtained by measuring the stress of a film which is held under conditions of room temperature and a predetermined initial load and is shrunk due to application of heat thereto at a predetermined heating rate, the maximum shrinkage temperature is defined as the first temperature showing the maximum shrinkage stress.

The shrinkage stress at the maximum shrinkage temperature is defined as the maximum shrinkage stress, and may be determined to be 0.65~1.30 kg/mm$^2$.

As is apparent from the graph of FIG. 1 showing the change in shrinkage stress depending on the change in temperature using a thermal stress tester, when the shrinkable film begins to shrink, a shrinkage stress curve is increased up to a predetermined temperature and then decreased after the temperature $T_{(Smax)}$ showing the maximum shrinkage stress $S_{max}$.

If the temperature $T_{(Smax)}$ at which the maximum shrinkage stress $S_{max}$ is exhibited is high, high-temperature heat treatment is required in the shrinking process and this affects the efficiency of the shrinking process, along with the temperature required to complete the heat treatment in the shrinking process.

From this point of view, the thermo-shrinkable polyester film according to the present invention may have the maximum shrinkage temperature in a main shrinking direction as low as 85~100° C., and further, may have the maximum shrinkage stress of 0.65~1.30 kg/mm$^2$ in terms of bondability of a label to a container.

The principle applied to assay the shrinkage starting temperature in a main shrinking direction, the maximum shrinkage temperature and the maximum shrinkage stress of the thermo-shrinkable polyester film, and the shrinkage starting temperature, the maximum shrinkage temperature and the maximum shrinkage stress deduced therefrom are described below.

(1) Principle

A polymer chain is oriented and crystallized through a stretching process and thus has a structure with a crystalline region and an amorphous region. When heat is applied to the stretched polymer, a relaxation phenomenon of stress remaining in the polymer chain and also a shrinkage phenomenon returning to an original shape occur. The force interrupting such shrinkage is referred to as shrinkage stress. As the shrinkage stress becomes higher, the shrinkage ratio is increased depending on the temperature, under the same conditions.

When the film held under conditions of room temperature and a predetermined initial load is heated at a predetermined heating rate, the stress changes of a sample caused by expansion and shrinkage depending on the changes in temperature are determined using an LVDT.

Using the above principle, information for shrinkage stress of the film depending on the change in temperature may be obtained. As such, the heating rate is dependant on the relaxation rate of residual stress of the polymer chain, and thus, in the present invention, the shrinkage stress depending on the change in temperature is measured at a heating rate of 2.5° C./sec.

The measured graph shows a pattern as illustrated in FIG. 1, in which the temperature at which the shrinkage stress having the value equal to the initial load Ls is first observed is defined as the shrinkage starting temperature Ts, the temperature corresponding to the peak of the graph is defined as the maximum shrinkage temperature $T_{(Smax)}$, and the stress at the maximum shrinkage temperature is defined as the maximum shrinkage stress $S_{max}$.

An example of the instrument used for realizing the above principle may include a thermal stress tester (KE-2, available from Kanebo Eng.) which is useful in the following examples and comparative examples.

In the shrinking process, heat applied for shrinkage partially has a temperature gradient. Depending on the temperature gradient, a container passing through a shrinking tunnel may shrink more or shrink less. The non-uniformity of shrinkage is undesirable in terms of stability of quality, and further, the non-uniformity of shrinkage may occur on one label, thus causing a defective outer appearance of the label and a poorly printed state.

According to the embodiment of the present invention, the thermo-shrinkable polyester film has a velocity of shrinkage of 0.5~3.5%/° C. in a main shrinking direction (i.e. TD), as represented by Equation 1 below.

$$\text{Velocity of Shrinkage} = \Delta L / \Delta T \qquad \text{Equation 1}$$

This equation is obtained by measuring dimension changes of a sample due to expansion and shrinkage depending on changes in temperature using an LVDT, in which ΔT is the change in temperature and ΔL is the deformation percentage in a main shrinking direction (i.e. TD), in the temperature range of 70~85° C.

An example of the instrument used for measuring and realizing the above principle may include a thermomechanical analyzer.

For measurements using the thermomechanical analyzer, a temperature program is applied to a sample so as to measure the deformation of the sample under a predetermined load. In the thermo-shrinkable film according to the present invention, the deformation percentage in a main shrinking direction (i.e. TD) depending on the change in temperature in the temperature range of 70~85° C. is 0.5~3.5%/° C.

If the velocity of shrinkage is lower than 0.5%/° C., shrinkage takes place incompletely, and thus the bondability of a label is decreased and the upper and lower ends of the label may be warped. In contrast, if the velocity of shrinkage is greater than 3.5%/° C., the shape of the container may be lost due to excessive shrinkage stress.

Also, the thermo-shrinkable polyester film according to the present invention has a rate of shrinkage deformation of 3.5~8.5 in a main shrinking direction (i.e. TD) as represented by Equation 2 below, obtained by differentiating the value of Equation 1, in which the temperature range in which the maximum rate of shrinkage deformation is obtained is 80~88° C.

$$\text{Rate of Shrinkage Deformation} = dL/dT \qquad \text{Equation 2}$$

This value is obtained by differentiating the value of Equation 1 showing dimension changes of a sample due to expansion and shrinkage depending on changes in temperature as measured using an LVDT, and specifically results from differentiation of the deformation percentage in a main shrinking direction (i.e. TD) depending on the change in temperature in the temperature range of 30~90° C. The above value indicates the maximum rate of shrinkage deformation in the measured temperature range.

This value is also obtained using a thermomechanical analyzer in the temperature range of 30~90° C.

Despite the wide temperature range, in the case where the rate of shrinkage deformation in a main shrinking direction (i.e. TD) is 3.5~8.5, the non-uniformity of shrinkage due to temperature variations may be reduced, thus advantageously achieving shrinkage uniformity.

Further, because the temperature range in which the maximum rate of shrinkage deformation is obtained is as low as 80~88° C., the problem of the non-uniformity of shrinkage caused by the temperature gradient during passing of the film through the shrinking tunnel using hot air or steam may be solved.

In the thermo-shrinkable polyester film according to the present invention, the principle for measuring the velocity of shrinkage in a main shrinking direction (i.e. TD), the rate of shrinkage deformation and the maximum shrinkage deformation temperature, and the velocity of shrinkage, the rate of shrinkage deformation and the maximum shrinkage deformation temperature deduced therefrom are described below.

(1) Principle

Dimension changes of a sample due to expansion and shrinkage depending on changes in temperature are determined using an LVDT. The deformation percentage in a main shrinking direction (i.e. TD) depending on the temperature is represented by Equation 1 below and is defined as the velocity of shrinkage.

$$\text{Velocity of Shrinkage} = \Delta L/\Delta T \qquad \text{Equation 1}$$

wherein $\Delta T$ is the change in temperature and $\Delta L$ is the deformation percentage in a main shrinking direction (i.e. TD), in the temperature range of 70~85° C.

The value of Equation 1 is differentiated, thus obtaining the value of Equation 2. The resultant maximum value is defined as the rate of shrinkage deformation.

$$\text{Rate of Shrinkage Deformation} = dL/dT \qquad \text{Equation 2}$$

This value is obtained by differentiating the deformation percentage in a main shrinking direction (i.e. TD) depending on the change in temperature in the temperature range of 30~90° C., and is determined to be the maximum value in the measured temperature range.

In the rate of shrinkage deformation obtained by Equation 2, the temperature at which the maximum rate of shrinkage deformation is obtained is defined as the maximum shrinkage deformation temperature.

An example of the instrument used for measuring and realizing the above principle may include a thermomechanical analyzer.

The shrinking process of the shrinkable film is performed in the shrinking tunnel using hot air or steam for a predetermined time. The shrinkage of the label may become non-uniform over time, and the non-uniformity of the shrinkage results in a defective outer appearance of the label and a poorly printed state.

According to the embodiment of the present invention, the thermo-shrinkable polyester film has a rate of change of shrinkage ratio of 4.0~10.0%/sec in a main shrinking direction with respect to time within 5 sec at 95° C. upon measurement of thermal shrinkage-force in a predetermined longitudinal direction using a thermal stress tester.

An example of the thermal stress tester may include a Testrite MKV shrinkage-force tester.

The Testrite MKV shrinkage-force tester is typically used to measure thermal stress of yarns or cords. Because the shrinkage ratio of the yarns or cords is much lower than that required for the shrinkable film, the shrinkable film cannot be applied in an unchanged state to the corresponding tester.

So, in order to measure the shrinkage ratio with respect to time at a predetermined temperature using a thermal stress tester, the measurement range (35.8%) of maximum shrinkage ratio is first confirmed, thus determining the measurable length change range. When the measurement range of maximum shrinkage ratio is confirmed, the allowable maximum sample length on the instrument is set and thus the measurable maximum sample length and the length change range may be calculated therefrom. The maximum shrinkable length of the sample is confirmed, and the length of the sample is predetermined within the measurable range on the instrument. In order to maintain the sample having a predetermined length in a state of being flat in the instrument, a predetermined load is applied to the sample, thus measuring the shrinkage ratio with time at a predetermined temperature. As such, the instrument is used to calculate the shrinkage ratio based on the sample length set thereon, and therefore, the measured shrinkage ratio is converted again into a length deformation value, thus determining the length deformation value with time. The value thus determined is divided by the actual sample length, thus obtaining the length deformation percentage of the sample. Thereby, the rate of change of shrinkage ratio with respect to time may be calculated.

The rate of change of shrinkage ratio with respect to time at a predetermined temperature is related to shrinkage uniformity for temperature and a production rate. According to the preferred embodiment of the present invention, the thermo-shrinkable polyester film has the rate of change of shrinkage ratio of 4.0~10.0%/sec in a main shrinking direction with respect to a predetermined time at a predetermined temperature, as measured through the above process. In particular, in an actual shrinking process, the rate of change of shrinkage ratio in a main shrinking direction with time within preferably 5 sec in consideration of the retention time may be 4.0~10.0%/sec.

If the rate of change of shrinkage ratio with time at a predetermined temperature is less than 4.0%/sec, long-term heat treatment is required to attain desired shrinking properties or high-temperature heat treatment is needed, consequently reducing the production rate or increasing the process cost and degrading the properties of the label. In contrast, if the rate of change of shrinkage ratio is greater than 10.0%/sec, stress is concentrated on the container due to instant shrinkage, undesirably causing loss of the shape of the container.

Also, the thermo-shrinkable polyester film according to the present invention may have shrinkage stress of 0.6~1.3 $kg/mm^2$ in a main shrinking direction when measured using the above instrument. The force required to tightly attach the label to the container may be deduced from the value of shrinkage stress. That the film has the shrinkage stress in the above range is favorable in terms of tight attachability to the container and dimensional stability of the label on the container.

According to the present invention, this test is performed at about 95° C., in consideration of the temperature range where the shrinkable label is processed and also where a melting process does not occur due to heat.

The thermo-shrinkable polyester film satisfying the above properties may be obtained from at least one copolyester selected from among copolyesters prepared from a dicarboxylic acid component including one or more selected from among known dicarboxylic acids such as terephthalic acid, oxalic acid, malonic acid, succinic acid, adipic acid, suberic acid, azelaic acid, sebacic acid, phthalic acid, isophthalic acid, naphthalene dicarboxylic acid and diphenylether dicarboxylic acid, and from a diol component including one or more selected from among known diols such as ethyleneglycol, neopentylglycol, propyleneglycol, trimethyleneglycol, tetramethyleneglycol, hexamethyleneglycol, diethyleneglycol, polyalkyleneglycol and 1,4-cyclohexanedimethanol; or a mixture of homopolyester and copolyester.

Also, the thermo-shrinkable polyester film according to the present invention has a thermal shrinkage ratio of 60% or more (95° C., 10 sec, free state, hot water) in a main shrinking direction (i.e. TD), and may be efficiently utilized in the manufacture of containers requiring a high thermal shrinkage ratio including containers having a simple shape or a high curvature.

As such, the copolyester may be composed of a dicarboxylic acid monomer including 80 mol % or more of a terephthalic acid monomer and a diol monomer including 14~24 mol % of a monomer other than ethyleneglycol. In the copolyester, the monomer other than ethyleneglycol monomer plays a role in reducing crystallinity of a polyester polymer to thus increase a shrinkage ratio. When the proportion of the corresponding monomer falls within the above range, the film may be favorably manufactured in terms of drying, film processing, melting and control of properties.

In the present invention, the copolyester itself may be prepared through a typical polyester preparation process. Examples of the polyester preparation process may include direct esterification including direct reaction of diol to dicarboxylic acid, and transesterification including reaction of diol to dimethylester of dicarboxylic acid.

According to the embodiment of the present invention, copolyester has a glass transition temperature of 67~77° C. and an intrinsic viscosity of 0.60~0.70 dl/g. As such, the glass transition temperature may be adjusted depending on the composition of the monomers used for the preparation of the polymer, and the intrinsic viscosity may vary depending on the degree of polymerization. So, in the present invention, copolyester satisfying glass transition temperature and intrinsic viscosity within the above range may be used.

On the other hand, in the case of two or more types of polyester, namely, a polyester mixture, the amount of terephthalic acid may be 80 mol % or more based on the total amount of dicarboxylic acid monomer in the polyester mixture, and the amount of monomer other than ethyleneglycol may be 14~24 mol % based on the total amount of diol monomer in the polyester mixture.

For example, in the present invention, homopolyester may include polybutyleneterephthalate, and the mixture of polybutyleneterephthalate and copolyester may be prepared into a film. As such, the amount of copolyester may be 85~93 wt % based on the total amount of polyester, and the amount of polybutyleneterephthalate may be 7~15 wt % based on the total amount of polyester.

If the amount of copolyester is too low, the thermal shrinkage ratio and the shrinkage stress are low and thus bondability of label to the container is decreased. In contrast, if the amount thereof is too high, the shrinkage stress is high and thus the loss of the shape of the container by the label may be caused during the shrinking process.

Typically, for commercial use of a shrinkable film, a solvent adhesion process for bonding a shrinkable film using a solvent is adopted. In this case, if the amount of polybutyleneterephthalate is too low, solvent adhesiveness is reduced and commercial use of the film may become difficult. In contrast, if the amount thereof is too high, the shrinkage ratio in a main shrinking direction (i.e. TD) may be lowered, and mechanical properties (strength and elongation) of the film in a direction (i.e. mechanical direction (MD)) perpendicular to a main shrinking direction may be deteriorated. The film is typically required to have mechanical properties in MD due to a need for many rolling steps upon commercial use thereof. If the film has poor mechanical properties, it may be cut or broken.

As the homopolymer, polytriethyleneterephthalate may be used instead of, or in addition to polybutyleneterephthalate.

Further, in order to improve sliding properties upon preparation of a film, a lubricant, for example, silicon dioxide, titanium dioxide, silica powder and calcium carbonate may be added, and various additives including an antistatic agent, an anti-aging agent, a UV protecting agent, and a dye may be added, if necessary.

The thermo-shrinkable polyester film having the above properties may be manufactured through the following procedures.

Material for the polyester film is dried in an oven and then extruded at 200~350° C. For extrusion, any known process for example T-die extrusion or tubular extrusion may be used.

The extruded product is rapidly cooled using an electrostatic charge contact process or the like, thus obtaining an unstretched film.

The unstretched film is passed through a roller that naturally moves in MD, preheated, stretched in TD, and then heat treated.

In the case where the temperature for the heat treatment is lower than the temperature for the preheating, residual stress for the shrinkable film is increased to thus increase the shrinkage ratio and the shrinkage rate.

According to a preferred embodiment, the temperature for the preheating may be 80~100° C., and the temperature for the heat treatment may be adjusted in the range of from room temperature to 95° C. As such, the temperature for the stretching is related to stretching stress remaining in the polymeric chain, and also to a shrinkage starting temperature or the like from the point of view of affecting the relaxation of residual stress in a shrinking process. So, in order to decrease the shrinkage starting temperature and the maximum shrinkage temperature, the temperature for the preheating may be set to 80~100° C., and the temperature for the stretching may be set to 70~95° C.

Before preheating, stretching the film in MD at a stretch ratio including a natural stretch ratio occurring as a result of natural movement in MD and an additional 0.1~5% may be further performed, thus improving the properties of the film in MD, which is preferable in terms of shrinkage uniformity.

The stretching in TD may be performed 3.0~5.0 times the original length.

In the case where the stretch ratio of the shrinkable film is low, the shrinkage ratio may be reduced. In contrast, if the stretch ratio is too high, breakdown may occur or it is difficult to improve additional properties, and thus the benefits of an increase in the stretch ratio disappear. Thus, the stretch ratio may be set in the range of about 3.0~5.0 times the original length.

The stretching process may be performed using a typical device, and any known process such as roll stretching, tenter stretching or tubular stretching may be applied.

The thermo-shrinkable polyester film thus obtained has a glass transition temperature in a main shrinking direction of 90~100° C. and an intrinsic viscosity of 0.60~0.70 dl/g, in which the glass transition temperature is a dynamic glass transition temperature through dynamic mechanical thermal analysis (DMTA).

In particular, the glass transition temperature and intrinsic viscosity of the film prepared from the copolyester satisfying the above glass transition temperature and intrinsic viscosity may fall within the above range.

[Mode for Invention]

A better understanding of the present invention may be obtained through the following examples, which are set forth to illustrate, but are not to be construed as the limit of the present invention.

The evaluation items used in the present invention are as follows.

(1) Intrinsic Viscosity (IV)

200 mg of a sample was added to 20 ml of a 50/50 solvent admixture of phenol and tetrachloroethane, after which the resulting mixture was heated to about 110° C. for 1 hour and then measured at 30° C.

(2) Glass Transition Temperature through DMTA

A sample having a width of 10 mm and a length of 30 mm (main shrinking direction) was subjected to an initial load of 2.5 N. In order to prevent the deformation of the sample due to fluctuation, static force for maintaining the sample was set to 2.5 N, and storage modulus E' and loss modulus E" were determined in the temperature range of 0~150° C. at a heating rate of 2° C./min under conditions of a measurement frequency of 10 Hz and a dynamic force of 2.5% using a dynamic mechanical thermal analyzer (EPLEXOR 500, available from Gabo), and then substituted into Equation 3 below, thus determining loss tangent (tan δ). As such, the temperature corresponding to the maximum tan δ is defined as a dynamic glass transition temperature (Tg).

$$\text{Loss Tangent (tan δ)} = \text{Loss Modulus }(E'')/\text{Storage Modulus }(E') \quad \text{Equation 3}$$

(3) Thermal Shrinkage Ratio

A film was cut into a square having a size of 20 cm×20 cm, thermally shrunk in hot water at 95° C.±0.5° C. under no load for 10 sec, after which the numerical values in MD and TD of the film were measured and then substituted into Equation 4 below, thus determining the thermal shrinkage ratio.

$$\text{Thermal Shrinkage Ratio} = \left(\frac{\text{length before shrinkage} - \text{length after shrinkage}}{\text{length before shrinkage}}\right) \times 100\ (\%) \quad \text{Equation 4}$$

(4) Shrinkage Starting Temperature, Maximum Shrinkage Temperature, Maximum Shrinkage Stress Using a thermal stress tester (KE-2, available from Kanebo Eng.), the shrinkage stress of a film sample having a width of 4 mm (MD) and a length of 50 mm (TD) held under an initial load of 0.125 kg/ad was measured depending on the temperature while heating the film at a heating rate of 2.5° C./sec, and then graphed.

On the graph, the temperature at which the value of shrinkage stress equal to the initial load of 0.125 kg/ad was first observed was defined as the shrinkage starting temperature Ts, the temperature at which the maximum shrinkage stress was first observed was defined as the maximum shrinkage temperature $T_{(Smax)}$, and the stress at the maximum shrinkage temperature was defined as the maximum shrinkage stress $S_{max}$.

(5) Velocity of Shrinkage, Rate of Shrinkage Deformation, Maximum Shrinkage Deformation Temperature Using a thermomechanical analyzer (Diamond TMA, available from Perkin Elmer), the deformation percentage in a main shrinking direction (i.e. TD) of a film sample having a width of 4 mm (MD) and a length of 15 mm (TD) under a load of 2 mN/μm was measured depending on the change in temperature in the temperature range of 30~90° C. at a heating rate of ° C./min, after which the change in length in a main shrinking direction (i.e. TD) depending on the temperature in the temperature range of 70~85° C. was calculated, thus determining the velocity of shrinkage.

Figure 2:
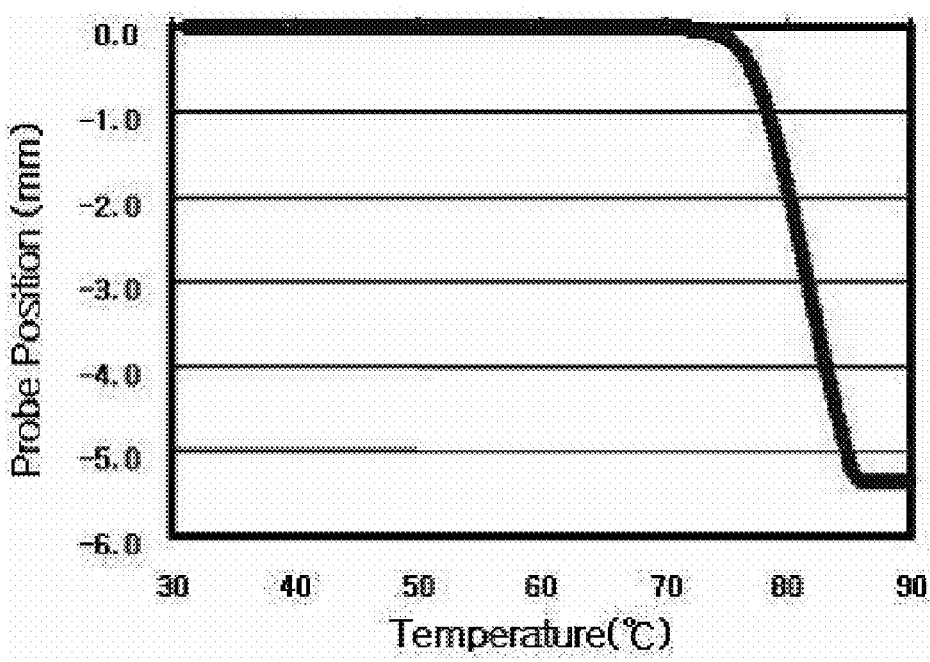
FIG. 2 is a graph showing the result of analysis of a thermo-shrinkable polyester film of Example 11 as measured using a thermomechanical analyzer.

The change in length in a main shrinking direction (TD) depending on the temperature as measured using a thermomechanical analyzer is depicted as a graph of probe position versus temperature as shown in FIG. 2.

This value was substituted into Equation 5 below, thus calculating a shrinkage ratio at each temperature.

$$\text{Shrinkage Ratio} = \{1 - ((\text{Initial Length} + \text{Probe Position})/\text{Initial Length})\} \times 100 \quad \text{Equation 5}$$

For example, in the case where the probe position is −5.0 mm in the graph of FIG. 2, a shrinkage ratio is calculated to be {1−((15 mm+(−5 mm))/15 mm)}×100=33.3%, in which 15 mm is a length of the sample in a main shrinking direction (i.e. TD).

The deformation percentage of the sample in a main shrinking direction (i.e. TD) depending on the change in temperature in the temperature range of 30~90° C. was measured, and then differentiated, thus obtaining a graph showing a rate of shrinkage deformation, the maximum value of which was defined as a rate of shrinkage deformation.

In the graph showing the rate of shrinkage deformation, the temperature where the maximum rate of shrinkage deformation was observed was measured and set to be the maximum shrinkage deformation temperature.

(6) Rate of Change of Shrinkage Ratio with Time at Predetermined Temperature

The shrinkage ratio was evaluated using a Testrite MKV shrinkage-force tester (available from Testrite Ltd, max. shrinkage ratio measurement range 35.8%, standard sample length 250 mm). This tester is used to evaluate the shrinkage ratio of yarn or cord. Thus, evaluation of the thermal shrinkage ratio of the shrinkable film needs preparation of a sample and correction and calculation of a result as described below.

Preparation of Sample: length (main shrinking direction) 120 mm, width 15 mm

Holding of Sample: Each 10 mm of both ends of the sample in a longitudinal direction was bound to a film having no thermal deformation at a corresponding measurement temperature, thus obtaining a heat shrinkable sample, namely, a sample of examples and comparative examples, having a length of 100 mm. In order to make the sample flat, an initial load of 20 g/mm² was applied to one end of the sample bound to the film having no thermal deformation, and the sample was located at the center of the tester.

The reason why the length of the heat shrinkable sample is set to 100 mm is that the shrinkage ratio can be the most stably measured when the sample has the above length, as a result of calculating the maximum length of the sample with the shrinkage ratio under conditions in which the measurement range of maximum shrinkage ratio of the corresponding tester is 35.8% and the measurable length deformation value of the corresponding tester is 89.5 mm.

The maximum length of the sample may vary with the shrinkage ratio, and may be calculated as follows.

For example, in the case of a film having a shrinkage ratio of 70% under the above measurement conditions, the maximum sample length is 127.9 mm (89.5 mm/0.7), and in the case of a shrinkage ratio of 80%, the maximum length is 111.9 mm (89.5 mm/0.8).

Thus, based on the measurable length deformation value deduced from the maximum shrinkage ratio relative to 250 mm which is a standard sample length, when the length of the sample for measurement of shrinkage ratio for high shrinkage of 70% or more is 100 mm, measurement can be most stably performed. Consequently, the length of the sample was set to 100 mm.

Measurement Method: A shrinkage ratio with time is measured under a predetermined load at 95° C. using a tester.

Correction of Result: The measured length deformation value of the sample relative to the sample length (250 mm) set in the tester is determined, and then converted into a value relative to the length of the sample, thereby determining a shrinkage ratio.

In the case where the deformation percentage in length of the sample is measured to be 10%, Actual length deformation value of sample=250 mm×0.1=25 mm Deformation percentage in length of sample=25 mm/100 mm×100=25%

The deformation percentage in length of the sample thus obtained was defined as a shrinkage ratio.

Analysis of Result: In order to prevent the confusion of shrinkage behavior occurring as a result of binding the sample to the film having no thermal deformation so as for the preparation of the sample, when the shrinkage ratio with time is calculated, the time immediately before the beginning of shrinkage of the sample is '0' sec, and the shrinkage ratio to 5 sec from 0 sec is calculated from the value of the tester and then substituted into Equation 6 below, thus determining a rate of change of shrinkage ratio.

Rate of Change of Shrinkage Ratio (%/sec)=Change of Shrinkage Ratio/Elapsed Time  Equation 6

(7) Shrinkage Stress

Using a Testrite MKV shrinkage-force tester (available from Testrite Ltd), shrinkage stress of a sample in a main shrinking direction with time at 95° C. was measured and then divided by the sectional area of the sample, and the resulting value was substituted into Equation 7 below, thus determining shrinkage stress.

The width of the sample was 15 mm, and an initial load of 20 g/mm$^2$ was applied to the sample in order to hold the sample flat.

Shrinkage Stress=Measured Shrinkage Stress (Kg)/ Sectional Area of Sample (width×thickness; mm$^2$)  Equation 7

Case) measured shrinkage stress: 10 N (1.02 Kg=10/9.8 Kg)

Sectional area of sample: 0.75 mm$^2$ (sample width 15 mm, thickness 50 μm)

Shrinkage Stress (Kg/mm$^2$)=1.02/0.75=1.36

(8) Evaluation of Shrinkage Uniformity

A figure was printed on the shrinkable film, and the film was bonded along edges thereof using a solvent, thus preparing a label, after which a container clothed in the label was passed through a steam type shrinking tunnel, thus obtaining a final product (a labeled container). The number of defects, due to the defective outer appearance of the label and the poorly printed state, was counted, thus evaluating shrinkage uniformity.

The steam tunnel having a length of 1.5 m was provided with four steam blowers 1.2 m long which are positioned at upper and lower levels of both sides of the tunnel to blow steam so as to shrink the label of the container passed therethrough. As such, pressure was set to 0.2 bar, so that steam was blown. The steam tunnel was provided with a temperature controller and a heater so as to adjust the temperature of steam at the inlet and outlet of the tunnel. The inlet temperature was set to 77° C. and the outlet temperature was set to 86° C. The label was shrunk in the tunnel within the retention time of 5 sec of the container clothed in the label, and thus the number of defects due to a defective outer appearance of a final product (the labeled container) and a poorly printed state was counted, thus evaluating shrinkage uniformity.

1000 samples were prepared, and the ratio of normal products defined as shrinkage uniformity was determined by Equation 8 below.

$$\text{Shrinkage Uniformity} = \left(\frac{1000 - \text{number of defects}}{1000}\right) \times 100 (\%) \quad \text{Equation 8}$$

(9) Properties of Shrinking Process Through Manufacture of Container

A figure was printed on the shrinkable film, and the film was bonded along edges thereof using a solvent, thus preparing a label, after which a container clothed in the label was passed through a steam type shrinking tunnel, thus obtaining a final product (labeled container). The number of defects due to the defective outer appearance of the label of the product and the poorly printed state was counted.

The steam tunnel having a length of 1.5 m was provided with four steam blowers 1.2 m long which are positioned at upper and lower levels of both sides thereof to blow steam so as to shrink the label of the container passed therethrough. As such, pressure was set to 0.2 bar, so that steam was blown. The steam tunnel was provided with a temperature controller and a heater so as to adjust the temperature of steam at the inlet and outlet of the tunnel.

As such, the inlet temperature of the tunnel was set to 80° C. and the outlet temperature thereof was set to 90° C. The label was shrunk in the tunnel within the retention time of 5 sec of the container clothed in the label, and thus the number of defects due to the defective outer appearance of the label of a final product (the labeled container) and the poorly printed state was counted, thus evaluating high-temperature shrinkage uniformity (yield A).

In addition, the inlet temperature of the tunnel was set to 75° C. and the outlet temperature was set to 84° C. The label was shrunk in the tunnel within the retention time of 4 sec of the container clothed in the label, and thus the number of defects due to the defective outer appearance of the label of a final product (the labeled container) and the poorly printed state was counted, thus evaluating low-temperature shrinkage uniformity (yield B).

1000 samples were prepared, and the ratio of normal products defined as shrinkage uniformity was determined by Equation 9 below.

$$\text{Yield } A(\text{or } B) = \left(\frac{1000 - \text{number of defects}}{1000}\right) \times 100 (\%) \quad \text{Equation 9}$$

$$\text{Relative Process Efficiency}(R) = (\text{Yield } B / \text{Yield } A) \times 100 (\%)$$

Example 1

100 mol % of terephthalic acid as a dibasic acid component, 100 mol % of ethyleneglycol and 24 mol % of neopentylglycol as glycol components, and 0.05 mol antimony trioxide (for the acid component) as a catalyst were polycondensed through direct esterification. The polymer thus obtained was added with 500 ppm silicon dioxide powder having an average particle size of 2.7 μm and then dried through a typical process, thus preparing copolyester having an intrinsic viscosity of 0.67 dl/g and a glass transition temperature of 76° C.

Separately, 100 mol % of terephthalic acid, 100 mol % of 1,4-butanediol, and 0.015 parts by weight of tetrabutyltitanate as a catalyst were polymerized, thus obtaining polybutyleneterephalate (intrinsic viscosity 0.97 dl/g, glass transition temperature 30° C.).

90 wt % of the copolymer and 10 wt % of the polybutyleneterephalate were blended, extruded using an extruder at 280° C., rapidly cooled and then solidified, thus obtaining an unstretched film.

The unstretched film was passed through a roller moving in MD, preheated at 85° C., stretched 4.0 times the width of the film at 75° C., and then heat treated at room temperature, thus manufacturing a thermo-shrinkable film having a thickness of 50 μm. The properties of the film are shown in Table 1 below.

Example 2

An unstretched film obtained in the same manner as in Example 1 was used.

The unstretched film was stretched in MD at a stretch ratio of (natural stretch ratio+0.5%) in the course of passing it through a stretching roller having a natural stretch ratio of 3% in MD, and then subjected to the same procedures as in Example 1, thus obtaining a thermo-shrinkable polyester film having a thickness of 50 μm. The properties of the film are shown in Table 1 below.

Example 3

An unstretched film obtained in the same manner as in Example 1 was used.

A thermo-shrinkable polyester film having a thickness of 50 μm was obtained in the same manner as in Example 1, with the exception that the unstretched film was passed through the roller moving in MD, preheated at 95° C., and then stretched 4.0 times the width thereof at 87° C. The properties of the film are shown in Table 1 below.

Example 4

An unstretched film obtained in the same manner as in Example 1 was used.

The unstretched film was stretched in MD at a stretch ratio of (natural stretch ratio+4.5%) in the course of passing it through a stretching roller having a natural stretch ratio of 3% in MD, and then subjected to the same procedures as in Example 3, thus obtaining a thermo-shrinkable polyester film having a thickness of 50 μm. The properties of the film are shown in Table 1 below.

Examples 5 to 8

Thermo-shrinkable polyester films were obtained in the same manner as in Examples 1 to 4, with the exception that the preheating was performed at 100° C.

Examples 9 and 10

Thermo-shrinkable polyester films were obtained in the same manner as in Examples 2 and 4, with the exception that the stretch ratio in MD was adjusted to (natural stretch ratio+1.0%).

Reference Examples 1 and 2

Thermo-shrinkable polyester films were obtained in the same manner as in Examples 2 and 4, with the exception that the stretch ratio in MD was adjusted to (natural stretch ratio+7.0%).

Comparative Examples 1 and 2

Thermo-shrinkable films were obtained in the same manner as in Examples 1 and 2, with the exception that the preheating was performed at 102° C., and the stretching in TD was performed at 96° C.

TABLE 1

| Ex. No. | Dyna. IV (dl/g) | Tg (° C.) | Thermal Shrinkage (%) MD | Thermal Shrinkage (%) TD | Analysis by Thermal Stress Tester Ts (° C.) | $T_{(Smax)}$ (° C.) | $S_{max}$ (kg/mm²) | Shrinking Process Yield A | Shrinking Process Yield B | Relative Process Efficie. (R %) | Veloci. of Shrink. (ΔL/ΔT) | Rate of Shrink. (dL/dT) | Max. Shrink. Deform. Temp. (° C.) | Shrink. Uni-Formity (%) | Rate of Change of Shrink. (%/sec) | Shrink. Stress (kg/mm²) |
|---|---|---|---|---|---|---|---|---|---|---|---|---|---|---|---|---|
| 1 | 0.682 | 94.9 | 3.0 | 74.6 | 79.5 | 92.3 | 1.22 | 99.9 | 99.8 | 99.9 | 3.3 | 8.0 | 80.2 | 99.8 | 9.2 | 1.28 |
| 2 | 0.683 | 97.0 | 4.2 | 74.1 | 80.3 | 93.1 | 1.18 | 99.9 | 99.7 | 99.8 | 3.5 | 8.3 | 80.6 | 99.9 | 8.9 | 1.19 |
| 3 | 0.670 | 93.0 | 2.5 | 65.2 | 83.3 | 96.3 | 0.99 | 99.8 | 96.7 | 96.9 | 1.7 | 5.7 | 83.7 | 99.5 | 6.1 | 0.90 |
| 4 | 0.673 | 95.2 | 5.0 | 64.7 | 84.4 | 96.0 | 0.97 | 99.7 | 97.7 | 98.0 | 1.2 | 4.8 | 84.2 | 98.3 | 5.7 | 0.85 |
| 5 | 0.675 | 93.2 | 2.3 | 73.3 | 81.7 | 95.3 | 1.02 | 99.9 | 99.7 | 99.8 | 3.1 | 7.5 | 82.0 | 99.6 | 9.1 | 1.18 |
| 6 | 0.677 | 93.7 | 3.8 | 72.6 | 82.1 | 97.0 | 0.98 | 99.8 | 99.5 | 99.7 | 3.2 | 7.8 | 82.4 | 99.7 | 8.8 | 1.05 |
| 7 | 0.662 | 91.1 | 2.0 | 63.2 | 83.4 | 97.0 | 0.86 | 99.7 | 97.6 | 97.9 | 1.5 | 5.0 | 83.2 | 99.4 | 5.9 | 0.86 |
| 8 | 0.664 | 91.5 | 4.8 | 62.7 | 83.7 | 97.3 | 0.85 | 99.7 | 96.5 | 96.8 | 0.9 | 4.3 | 84.1 | 98.4 | 5.2 | 0.81 |
| 9 | 0.680 | 98.3 | 4.5 | 74.3 | 80.8 | 92.5 | 1.06 | 99.9 | 99.8 | 99.9 | 3.4 | 7.9 | 80.9 | 98.7 | 8.7 | 1.15 |
| 10 | 0.675 | 94.5 | 3.8 | 64.9 | 83.4 | 96.0 | 0.96 | 99.8 | 97.3 | 97.5 | 1.6 | 5.3 | 83.3 | 98.4 | 7.4 | 1.12 |
| R. 1 | 0.683 | 99.7 | 7.5 | 73.3 | 86.4 | 95.8 | 1.03 | 89.5 | 70.3 | 78.5 | 3.0 | 7.3 | 86.5 | 77.2 | 7.6 | 1.08 |
| R. 2 | 0.674 | 96.3 | 6.5 | 63.5 | 87.8 | 99.0 | 0.98 | 91.3 | 71.5 | 78.3 | 1.0 | 4.5 | 87.5 | 75.4 | 4.7 | 0.89 |
| C. 1 | 0.651 | 88.7 | 1.5 | 52.3 | 91.3 | 100.1 | 0.68 | 99.9 | 58.4 | 58.5 | 0.2 | 3.0 | 90.0 | 51.7 | 3.8 | 0.59 |
| C. 2 | 0.653 | 89.5 | 2.3 | 51.8 | 92.3 | 100.4 | 0.65 | 99.8 | 53.2 | 53.3 | 0.3 | 3.2 | 90.0 | 51.5 | 3.7 | 0.58 |

As is apparent from the results of measurements of the properties of the film, the thermo-shrinkable film having a shrinkage starting temperature of 72~88° C. in a main shrinking direction as measured using a thermal stress tester had high low-temperature shrinkage uniformity when applied to a shrinking process, and thus had high relative process efficiency. Thereby, it could be seen that the temperature of the shrinking process was lowered and the production rate was improved, leading to superior cost and quality.

Further, as the maximum shrinkage stress temperature was measured to be 85~100° C., the temperature of the shrinking process could be lowered, thereby reducing the process cost.

FIG. 1 is a graph showing the change in shrinkage stress versus temperature in a main shrinking direction of the thermo-shrinkable polyester film of Example 1 as measured using a thermal stress tester.

Example 11

100 mol % of terephthalic acid as a dibasic acid component, 100 mol % of ethyleneglycol and 24 mol % neopentylglycol as glycol components, and 0.05 mol antimony trioxide (for the acid component) as a catalyst were polycondensed through direct esterification. The polymer thus obtained was added with 500 ppm silicon dioxide powder having an average particle size of 2.7 μm and then dried through a typical process, thus preparing copolyester having an intrinsic viscosity of 0.67 dl/g and a glass transition temperature of 76° C.

Separately, 100 mol % of terephthalic acid, 100 mol % of 1,4-butanediol, and 0.015 parts by weight of tetrabutyltitanate as a catalyst were polymerized, thus obtaining polybutyleneterephalate (intrinsic viscosity 0.97 dl/g, glass transition temperature 30° C.).

90 wt % of the copolyester and 10 wt % of the polybutyleneterephalate were blended, extruded using an extruder at 280° C., rapidly cooled and then solidified, thus obtaining an unstretched film.

Subsequently, the unstretched film was passed through a roller moving in MD, preheated at 87° C., stretched 4.0 times the width of the film at 82° C., and then heat treated at room temperature, thus manufacturing a thermo-shrinkable film having a thickness of 50 μm. The properties of the film are shown in Table 2 below.

Example 12

An unstretched film obtained in the same manner as in Example 11 was used.

Subsequently, the unstretched film was stretched in MD at a stretch ratio including a natural stretch ratio and 0.4% in the course of transporting it via a stretching roller moving in MD, and then subjected to the same procedures as in Example 11, thus obtaining a thermo-shrinkable polyester film having a thickness of 50 μm. The properties of the film are shown in Table 2 below.

Example 13

An unstretched film obtained in the same manner as in Example 11 was used.

A thermo-shrinkable polyester film having a thickness of 50 μm was obtained in the same manner as in Example 11, with the exception that the preheating was performed at 95° C., and then the heat treatment was performed at 87° C. The properties of the film are shown in Table 2 below.

Example 14

A thermo-shrinkable polyester film was manufactured in the same manner as in Example 13, with the exception that the extruded unstretched film was stretched in MD at a stretch ratio of (natural stretch ratio+3.4%) in the course of passing it through a stretching roller having a natural stretch ratio of 3% in MD.

The films thus obtained were 50 μm thick. The properties of the films are shown in Table 2 below.

Reference Examples 3 and 4

Thermo-shrinkable polyester films were obtained in the same manner as in Examples 12 and 14, with the exception that the stretch ratio in MD was adjusted to (natural stretch ratio+7%).

The films thus obtained were 50 μm thick. The properties of the films are shown in Table 2 below.

Comparative Examples 3 and 4

Thermo-shrinkable films were obtained in the same manner as in Examples 11 and 12, with the exception that the preheating was performed at 85° C., and the heat treatment was performed at 95° C.

The films thus obtained were 50 μm thick. The properties of the films are shown in Table 2 below.

TABLE 2

| Ex. No. | Dyna. IV (dl/g) | Tg (° C.) | Thermal Shrinkage (%) MD | Thermal Shrinkage (%) TD | Analysis by Thermal Stress Tester Ts (° C.) | Analysis by Thermal Stress Tester $T_{(Smax)}$ (° C.) | Analysis by Thermal Stress Tester $S_{max}$ (kg/mm²) | Shrinking Process Yield A | Shrinking Process Yield B | Relative Process Efficie. (R %) | Veloci. of Shrink. (ΔL/ΔT) | Rate of Shrink. Deform. (dL/dT) | Max. Shrink. Deform. Temp. (° C.) | Shrink. Uniformity (%) | Rate of Change of Shrink. (%/sec) | Shrink. Stress (kg/mm²) |
|---|---|---|---|---|---|---|---|---|---|---|---|---|---|---|---|---|
| 11 | 0.692 | 94.5 | 2.2 | 72.4 | 82.0 | 93.9 | 1.15 | 99.9 | 99.8 | 99.9 | 2.8 | 6.9 | 81.9 | 99.7 | 8.9 | 1.25 |
| 12 | 0.691 | 95.2 | 3.2 | 74.5 | 80.7 | 92.7 | 1.27 | 99.9 | 99.8 | 99.9 | 3.3 | 7.7 | 80.5 | 99.8 | 9.2 | 1.20 |
| 13 | 0.670 | 93.4 | 1.8 | 62.3 | 85.3 | 96.0 | 0.87 | 99.7 | 99.5 | 99.8 | 1.2 | 4.9 | 85.0 | 99.5 | 5.8 | 0.85 |
| 14 | 0.668 | 93.8 | 4.7 | 61.1 | 86.7 | 96.2 | 0.85 | 98.7 | 96.7 | 98.0 | 0.9 | 4.0 | 86.5 | 99.4 | 4.9 | 0.83 |
| R. 3 | 0.683 | 98.2 | 7.9 | 74.0 | 83.2 | 97.3 | 1.05 | 90.3 | 75.2 | 83.3 | 3.1 | 5.9 | 82.7 | 75.4 | 7.7 | 1.14 |
| R. 4 | 0.671 | 97.4 | 7.5 | 60.3 | 87.5 | 98.7 | 0.90 | 88.7 | 74.5 | 84.0 | 0.6 | 4.2 | 87.3 | 76.7 | 4.3 | 0.64 |
| C. 3 | 0.665 | 90.4 | 1.5 | 58.7 | 91.4 | 100.3 | 0.72 | 99.8 | 59.4 | 59.5 | 0.3 | 3.2 | 90.0 | 54.3 | 3.9 | 0.60 |
| C. 4 | 0.663 | 90.2 | 2.4 | 57.0 | 92.7 | 101.1 | 0.68 | 98.8 | 57.5 | 58.2 | 0.1 | 2.8 | 90.0 | 57.3 | 3.8 | 0.59 |

As is apparent from the results of measurements of the properties of the film, when the velocity of shrinkage was measured to be 0.5~3.5%/° C., shrinkage uniformity of the final product could be seen to be superior, thus improving the productivity of the product.

Also, when the rate of shrinkage deformation was 3.5~8.5 and the maximum shrinkage deformation temperature was 80~88° C., shrinkage uniformity could be seen to be superior.

FIG. 2 is a graph showing the deformation percentage of the thermo-shrinkable polyester film of Example 11 depending on the change in temperature as measured using a thermomechanical analyzer.

Example 15

100 mol % of terephthalic acid as a dibasic acid component, 100 mol % of ethyleneglycol and 24 mol % of neopentylglycol as glycol components, and 0.05 mol antimony trioxide (for the acid component) as a catalyst were polycondensed through direct esterification. The polymer thus obtained was added with 500 ppm silicon dioxide powder having an average particle size of 2.7 μm and then dried through a typical process, thus preparing copolyester having an intrinsic viscosity of 0.67 dl/g and a glass transition temperature of 76° C.

Separately, 100 mol % of terephthalic acid, 100 mol % of 1,4-butanediol, and 0.015 parts by weight of tetrabutyltitanate as a catalyst were polymerized, thus obtaining polybutyleneterephalate (intrinsic viscosity 0.97 dl/g, glass transition temperature 30° C.).

91 wt % of the copolyester and 9 wt % of the polybutyleneterephalate were blended, extruded using an extruder at 280° C., rapidly cooled and then solidified, thus obtaining an unstretched film.

The unstretched film was passed through a roller moving in MD, preheated at 87° C., stretched 4.0 times the width of the film at 84° C., and then heat treated in the temperature range of from room temperature to 60° C., thus manufacturing a thermo-shrinkable film having a thickness of 50 μm. The properties of the film are shown in Table 3 below.

Example 16

An unstretched film obtained in the same manner as in Example 15 was used.

Subsequently, the unstretched film was stretched in MD at a stretch ratio including natural stretch ratio and 0.4% in the course of transporting it via a stretching roller moving in MD, and then subjected to the same procedures as in Example 15, thus obtaining a thermo-shrinkable polyester film having a thickness of 50 μm. The properties of the film are shown in Table 3 below.

Example 17

An unstretched film obtained in the same manner as in Example 15 was used.

Subsequently, a thermo-shrinkable polyester film having a thickness of 50 μm was obtained in the same manner as in Example 15, with the exception that the unstretched film was preheated at 95° C., stretched 4.0 times the width thereof at 87° C., and then heat treated at 85° C. The properties of the film are shown in Table 3 below.

Example 18

A thermo-shrinkable polyester film was manufactured in the same manner as in Example 17, with the exception that the extruded unstretched film was stretched in MD at a stretch ratio of (natural stretch ratio+3%) in the course of passing it through a stretching roller having a natural stretch ratio of 3% in MD.

The film thus obtained was 50 μm thick. The properties of the film are shown in Table 3 below.

Reference Examples 5 AND 6

Thermo-shrinkable polyester films were obtained in the same manner as in Examples 16 and 18, with the exception that the stretch ratio in MD was adjusted to (natural stretch ratio+7%).

The films thus obtained were 50 μm thick. The properties of the films are shown in Table 3 below.

Comparative Examples 5 and 6

Thermo-shrinkable films were obtained in the same manner as in Examples 15 and 16, with the exception that the preheating was performed at 90° C., and the heat treatment was performed at 96° C.

The films thus obtained were 50 μm thick. The properties of the films are shown in Table 3 below.

TABLE 3

| Ex. No. | IV (dl/g) | Dyna. Tg (° C.) | Thermal Shrinkage (%) MD | Thermal Shrinkage (%) TD | Thermal Stress Tester Ts (° C.) | Thermal Stress Tester $T_{(Smax)}$ (° C.) | Thermal Stress Tester $S_{max}$ (kg/mm²) | Shrinking Process Yield A | Shrinking Process Yield B | Shrinking Process Relative Efficie. (R %) | Veloci. of Shrink. (ΔL/ΔT) | Rate of Shrink. Deform. (dL/dT) | Max. Shrink. Deform. Temp. (° C.) | Shrink. Uni-Formity (%) | Rate of Change of Shrink. (%/sec) | Shrink. Stress (kg/mm²) |
|---|---|---|---|---|---|---|---|---|---|---|---|---|---|---|---|---|
| 15 | 0.609 | 94.3 | 2.4 | 74.5 | 80.2 | 93.0 | 1.29 | 99.8 | 99.7 | 99.9 | 3.0 | 7.7 | 80.8 | 99.7 | 9.1 | 1.21 |
| 16 | 0.688 | 94.7 | 2.7 | 74.0 | 79.4 | 92.4 | 1.26 | 99.8 | 99.8 | 100 | 3.2 | 7.9 | 80.5 | 99.9 | 8.7 | 1.07 |
| 17 | 0.672 | 93.3 | 3.2 | 63.5 | 86.1 | 95.6 | 1.01 | 99.7 | 99.5 | 99.8 | 1.2 | 4.7 | 85.7 | 98.7 | 5.9 | 0.87 |
| 18 | 0.671 | 95.3 | 4.8 | 61.4 | 86.7 | 96.1 | 0.99 | 99.7 | 98.5 | 98.8 | 1.0 | 4.5 | 86.4 | 98.5 | 4.7 | 0.73 |
| R. 5 | 0.687 | 98.5 | 8.0 | 69.5 | 83.3 | 96.2 | 0.98 | 87.5 | 72.5 | 82.9 | 2.0 | 6.0 | 82.6 | 75.3 | 7.5 | 1.05 |
| R. 6 | 0.673 | 97.4 | 7.7 | 60.2 | 87.8 | 98.7 | 0.89 | 86.7 | 71.2 | 82.1 | 0.7 | 4.2 | 87.4 | 65.2 | 4.1 | 0.61 |
| C. 5 | 0.653 | 89.0 | 1.8 | 51.5 | 92.7 | 100.7 | 0.64 | 99.6 | 51.4 | 51.6 | 0.3 | 3.4 | 90.0 | 53.2 | 3.8 | 0.59 |
| C. 6 | 0.652 | 89.7 | 1.9 | 50.4 | 93.3 | 102.1 | 0.63 | 99.7 | 52.1 | 52.3 | 0.2 | 3.1 | 90.0 | 50.8 | 3.5 | 0.50 |

As is apparent from the results of measurements of the properties of the film, when the rate of change of shrinkage ratio in a main shrinking direction with time at a predetermined temperature was measured to be 4.0~10.0%/sec, shrinkage uniformity could be seen to be superior.

Also, when the shrinkage stress in a main shrinking direction was measured to be 0.6~1.3 kg/mm², shrinkage uniformity could be seen to be superior.

Figure 3:
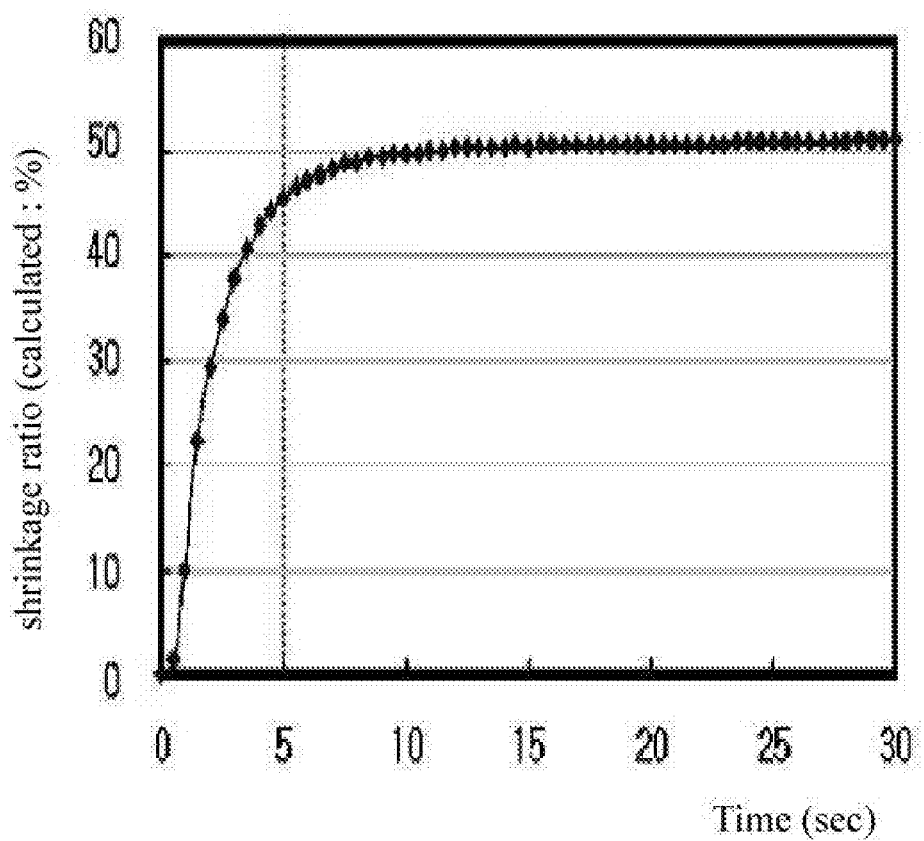
FIG. 3 is a graph showing the result (change in shrinkage ratio with time) of analysis of a thermo-shrinkable polyester film of Example 15 as measured using a Testrite MKV shrinkage-force tester (available from Testrite Ltd.).

FIG. 3 is a graph showing the result (change in shrinkage ratio with time) of the thermo-shrinkable polyester film of Example 15 as measured using a Testrite MKW shrinkage-force Tester (available from Testrite Ltd.).

The invention claimed is:

1. A thermo-shrinkable polyester film having a rate of change of shrinkage ratio of 4.0-10.0%/sec in a main shrinking direction with respect to time within 5 sec at 95° C. upon measurement of thermal shrinkage-force in a predetermined longitudinal direction using a thermal stress tester.

2. The thermo-shrinkable polyester film according to claim 1, which has the shrinkage stress of 0.6-1.3 kg/mm² in a main shrinking direction at 95° C.

3. The thermo-shrinkable polyester film according to claim 1, wherein the velocity of shrinkage in a transverse direction as a main shrinking direction as represented by Equation 1 below is 0.5-3.5%/° C.:

$$\text{Velocity of Shrinkage} = \Delta L/\Delta T \quad \text{Equation 1}$$

wherein the equation is obtained by measuring dimension changes of a sample due to expansion and shrinkage depending on changes in temperature using a linear variable differential transformer, in which $\Delta T$ is a change in temperature and $\Delta L$ is a deformation percentage in a transverse direction as a main shrinking direction, in a temperature range of 70-85° C.

4. The thermo-shrinkable polyester film according to claim 1, which has a maximum shrinkage temperature of 85-100° C. in a main shrinking direction and a maximum shrinkage stress of 0.65-1.30 kg/mm² in a main shrinking direction, in which the maximum shrinkage temperature is defined as, on the graph of shrinkage stress versus temperature obtained by measuring stress of a film which is held under conditions of room temperature and a predetermined initial load (0.125 kg/mm²) and is shrunk due to application of heat thereto at a predetermined heating rate (2.5° C./sec), a first temperature showing the maximum shrinkage stress, and the maximum shrinkage stress is defined as a peak of the graph of shrinkage stress versus temperature obtained by measuring stress of a film which is held under conditions of room temperature and a predetermined initial load (0.125 kg/mm²) and is shrunk due to application of heat thereto at a predetermined heating rate (2.5° C./sec).

5. The thermo-shrinkable polyester film according to claim 1, which has a dynamic glass transition temperature of 90-100° C. in a main shrinking direction as measured through dynamic mechanical thermal analysis and an intrinsic viscosity of 0.60-0.70 dl/g.

6. The thermo-shrinkable polyester film according to claim 1, which has a rate of shrinkage deformation of 3.5-8.5 in a transverse direction as a main shrinking direction as represented by Equation 2 below:

$$\text{Rate of Shrinkage Deformation} = dL/dT \quad \text{Equation 2}$$

wherein the value is obtained by differentiating the deformation percentage in a transverse direction as a main shrinking direction depending on the change in temperature in a temperature range of 30-90° C. as represented by Equation 1 showing dimension changes of a sample due to expansion and shrinkage depending on changes in temperature measured using a linear variable differential transformer, and indicates a maximum rate of deformation in the temperature range.

7. The thermo-shrinkable polyester film according to claim 1, which has a thermal shrinkage ratio of 60% or more (at 95° C., 10 sec, free state) in a transverse direction as a main shrinking direction.

8. The thermo-shrinkable polyester film according to claim 1, which comprises at least one copolyester prepared from one or more dicarboxylic acid and two or more diols, or a mixture of a homopolyester and the copolyester, wherein said dicarboxylic acid is selected from the group consisting of terephthalic acid, oxalic acid, malonic acid, succinic acid, adipic acid, suberic acid, azelaic acid, sebacic acid, phthalic acid, isophthalic acid, naphthalene dicarboxylic acid and diphenylether dicarboxylic acid, and said diols are selected from the group consisting of ethyleneglycol, neopentylglycol, propyleneglycol, trimethyleneglycol, tetramethyleneglycol, hexamethyleneglycol, diethyleneglycol, polyalkyleneglycol and 1,4-cyclohexanedimethanol.

9. The thermo-shrinkable polyester film according to claim 1, which is manufactured by subjecting the polyester to extrusion at 200-350° C., preheating at 80-100° C. and then stretching in a transverse direction at 70-95° C.

10. The thermo-shrinkable polyester film according to claim 1, which is manufactured by subjecting the polyester to extrusion, preheating, stretching in a transverse direction and then heat treatment, wherein a temperature for the heat treatment is set to be lower than a temperature for the preheating.

11. A thermo-shrinkable polyester film having a shrinkage starting temperature of 72-88° C. in a main shrinking direction, in which the shrinkage starting temperature is defined as, on a graph of shrinkage stress versus temperature obtained by measuring stress of a film which is held under conditions of room temperature and a predetermined initial load (0.125 Kg/mm²) and is shrunk due to application of heat thereto at a predetermined heating rate (2.5° C./sec), a first temperature showing shrinkage stress having a value equal to the initial load, wherein the velocity of shrinkage in a transverse direction as a main shrinking direction as represented by Equation 1 below is 0.5-3.5%/° C.:

$$\text{Velocity of Shrinkage} = \Delta L/\Delta T \quad \text{Equation 1}$$

wherein the equation is obtained by measuring dimension changes of a sample due to expansion and shrinkage depending on changes in temperature using a linear variable differential transformer, in which $\Delta T$ is a change in temperature and $\Delta L$ is a deformation percentage in a transverse direction as a main shrinking direction, in a temperature range of 70-85° C.

12. A thermo-shrinkable polyester film having a shrinkage starting temperature of 72-88° C. in a main shrinking direction, in which the shrinkage starting temperature is defined as, on a graph of shrinkage stress versus temperature obtained by measuring stress of a film which is held under conditions of room temperature and a predetermined initial load (0.125 Kg/mm²) and is shrunk due to application of heat thereto at a predetermined heating rate (2.5° C./sec), a first temperature showing shrinkage stress having a value equal to the initial load, wherein the rate of change of shrinkage ratio in a main shrinking direction with respect to time within 5 sec at 95° C. upon measurement of thermal shrinkage-force in a predetermined longitudinal direction using a thermal stress tester is 4.0-10.0%/sec.

13. The thermo-shrinkable polyester film according to claim 12, which has the shrinkage stress of 0.6-1.3 kg/mm² in a main shrinking direction at 95° C.

14. A thermo-shrinkable polyester film having a shrinkage starting temperature of 72-88° C. in a main shrinking direction, in which the shrinkage starting temperature is defined as, on a graph of shrinkage stress versus temperature obtained by measuring stress of a film which is held under conditions of room temperature and a predetermined initial load (0.125 Kg/mm²) and is shrunk due to application of heat thereto at a predetermined heating rate (2.5° C./sec), a first temperature showing shrinkage stress having a value equal to the initial load, wherein the thermo-shrinkable polyester film has a maximum shrinkage temperature of 85-100° C. in a main shrinking direction and a maximum shrinkage stress of 0.65-1.30 kg/mm² in a main shrinking direction, in which the maximum shrinkage temperature is defined as, on the graph of shrinkage stress versus temperature obtained by measuring stress of a film which is held under conditions of room temperature and a predetermined initial load (0.125 kg/mm²) and is shrunk due to application of heat thereto at a predetermined heating rate (2.5° C./sec), a first temperature showing the maximum shrinkage stress, and the maximum shrinkage stress is defined as a peak of the graph of shrinkage stress versus temperature obtained by measuring stress of a film which is held under conditions of room temperature and a predetermined initial load (0.125 kg/mm²) and is shrunk due to application of heat thereto at a predetermined heating rate (2.5° C./sec).

15. A thermo-shrinkable polyester film having a shrinkage starting temperature of 72-88° C. in a main shrinking direction, in which the shrinkage starting temperature is defined as, on a graph of shrinkage stress versus temperature obtained by measuring stress of a film which is held under conditions of room temperature and a predetermined initial load (0.125 Kg/mm²) and is shrunk due to application of heat thereto at a predetermined heating rate (2.5° C./sec), a first temperature showing shrinkage stress having a value equal to the initial load, wherein the thermo-shrinkable polyester film has a dynamic glass transition temperature of 90-100° C. in a main shrinking direction as measured through dynamic mechanical thermal analysis and an intrinsic viscosity of 0.60-0.70 dl/g.

16. A thermo-shrinkable polyester film having a shrinkage starting temperature of 72-88° C. in a main shrinking direction, in which the shrinkage starting temperature is defined as, on a graph of shrinkage stress versus temperature obtained by measuring stress of a film which is held under conditions of room temperature and a predetermined initial load (0.125 Kg/mm²) and is shrunk due to application of heat thereto at a predetermined heating rate (2.5° C./sec), a first temperature showing shrinkage stress having a value equal to the initial load, wherein the thermo-shrinkable polyester film has a rate of shrinkage deformation of 3.5-8.5 in a transverse direction as a main shrinking direction as represented by Equation 2 below:

$$\text{Rate of Shrinkage Deformation} = dL/dT \qquad \text{Equation 2}$$

wherein the value is obtained by differentiating the deformation percentage in a transverse direction as a main shrinking direction depending on the change in temperature in a temperature range of 30-90° C. as represented by Equation 1 showing dimension changes of a sample due to expansion and shrinkage depending on changes in temperature measured using a linear variable differential transformer, and indicates a maximum rate of deformation in the temperature range.

17. The thermo-shrinkable polyester film according to claim 16, wherein a temperature range in which the maximum rate of shrinkage deformation in a transverse direction as a main shrinking direction is exhibited is 80-88° C.

18. A thermo-shrinkable polyester film having a shrinkage starting temperature of 72-88° C. in a main shrinking direction, in which the shrinkage starting temperature is defined as, on a graph of shrinkage stress versus temperature obtained by measuring stress of a film which is held under conditions of room temperature and a predetermined initial load (0.125 Kg/mm²) and is shrunk due to application of heat thereto at a predetermined heating rate (2.5° C./sec), a first temperature showing shrinkage stress having a value equal to the initial load, wherein the thermo-shrinkable polyester film has a thermal shrinkage ratio of 60% or more (at 95° C., 10 sec, free state) in a transverse direction as a main shrinking direction.

19. A thermo-shrinkable polyester film having a shrinkage starting temperature of 72-88° C. in a main shrinking direction, in which the shrinkage starting temperature is defined as, on a graph of shrinkage stress versus temperature obtained by measuring stress of a film which is held under conditions of room temperature and a predetermined initial load (0.125 Kg/mm²) and is shrunk due to application of heat thereto at a predetermined heating rate (2.5° C./sec), a first temperature showing shrinkage stress having a value equal to the initial load, wherein the thermo-shrinkable polyester film comprises at least one copolyester prepared from one or more dicarboxylic acid and two or more diols, or a mixture of a homopolyester and the copolyester, wherein said dicarboxylic acid is selected from the group consisting of terephthalic acid, oxalic acid, malonic acid, succinic acid, adipic acid, suberic acid, azelaic acid, sebacic acid, phthalic acid, isophthalic acid, naphthalene dicarboxylic acid and diphenylether dicarboxylic acid; and said diols comprise ethyleneglycol and another diol selected from the group consisting of neopentylglycol, propyleneglycol, trimethyleneglycol, tetramethyleneglycol, hexamethyleneglycol, diethyleneglycol, polyalkyleneglycol and 1,4-cyclohexanedimethanol, wherein the the dicarboxylic acid includes about 80 mol % or more of a terephthalic acid and wherein the content of the another diol is about 14-24 mol % based on the total amount of the diols.

20. The thermo-shrinkable polyester film according to claim 19, wherein the copolyester has a glass transition temperature of 67-77° C. and an intrinsic viscosity of 0.60-0.70 dl/g.

21. A thermo-shrinkable polyester film having a shrinkage starting temperature of 72-88° C. in a main shrinking direction, in which the shrinkage starting temperature is defined as, on a graph of shrinkage stress versus temperature obtained by measuring stress of a film which is held under conditions of room temperature and a predetermined initial load (0.125 Kg/mm²) and is shrunk due to application of heat thereto at a predetermined heating rate (2.5° C./sec), a first temperature showing shrinkage stress having a value equal to the initial load, wherein the thermo-shrinkable polyester film comprises at least one copolyester prepared from one or more dicarboxylic acid and two or more diols, or a mixture of a homopolyester and the copolyester, and wherein the homopolyester comprises polybutyleneterephthalate or polytriethyleneterephthalate.

22. A thermo-shrinkable polyester film having a shrinkage starting temperature of 72-88° C. in a main shrinking direction, in which the shrinkage starting temperature is defined as, on a graph of shrinkage stress versus temperature obtained by measuring stress of a film which is held under conditions of room temperature and a predetermined initial load (0.125 Kg/mm²) and is shrunk due to application of heat thereto at a predetermined heating rate (2.5° C./sec), a first temperature showing shrinkage stress having a value equal to the initial load, wherein the thermo-shrinkable polyester film comprises at least one copolyester prepared from one or more dicarboxylic acid and two or more diols, or a mixture of a homopolyester and the copolyester, wherein said dicarboxylic acid is selected from the group consisting of terephthalic acid, oxalic acid, malonic acid, succinic acid, adipic acid, suberic acid, azelaic acid, sebacic acid, phthalic acid, isophthalic acid, naphthalene dicarboxylic acid and diphenylether dicarboxylic acid; and said diols are selected from the group consisting of ethyleneglycol, neopentylglycol, propyleneglycol, trimethyleneglycol, tetramethyleneglycol, hexamethyleneglycol, diethyleneglycol, polyalkyleneglycol and 1,4-cyclohexanedimethanol, and wherein the copolyester is used in an amount of 85-93 wt % based on a total amount of the polyester.

23. A method of manufacturing a thermo-shrinkable polyester film through extrusion and stretching of polyester, comprising:

extruding polyester at 200-350° C., thus obtaining an extruded polyester sheet;

preheating the extruded polyester sheet at 80-100° C.; and stretching the polyester sheet in a transverse direction at 70-95° C., wherein the thermo-shrinkable polyester film has a shrinkage starting temperature of 72-88° C. in a main shrinking direction, in which the shrinkage starting temperature is defined as, on a graph of shrinkage stress versus temperature obtained by measuring stress of a film which is held under conditions of room temperature and a predetermined initial load (0.125 Kg/mm²) and is shrunk due to application of heat thereto at a predetermined heating rate (2.5° C./sec), a first temperature showing shrinkage stress having a value equal to the initial load.

24. A method of manufacturing a thermo-shrinkable polyester film through extrusion and stretching of polyester, comprising:

extruding polyester at 200-350° C., thus obtaining an extruded polyester sheet;

preheating the extruded polyester sheet;

stretching the polyester sheet; and heat treating the polyester sheet, wherein a temperature for the heat treating is set to be lower than a temperature for the preheating, and the thermo-shrinkable polyester film has a rate of change of shrinking ratio of 4.0-10.0%/sec in a main shrinking direction with respect to time within 5 sec at 95° C. upon measurement of thermal shrinkage-force in a predetermined longitudinal direction using a thermal stress tester.

25. The method according to claim 24, wherein the preheating is performed at 80-100° C., and the heat treating is performed in a temperature range of from room temperature to 95° C.

26. A thermo-shrinkable polyester film having a velocity of shrinkage of 0.5-3.5%/° C. in a transverse direction as a main shrinking direction, as represented by Equation 1 below:

$$\text{Velocity of Shrinkage} = \Delta L / \Delta T \qquad \text{Equation 1}$$

wherein the equation is obtained by measuring dimension changes of a sample due to expansion and shrinkage depending on changes in temperature using a linear variable differential transformer, in which $\Delta T$ is a change in temperature and $\Delta L$ is a deformation percentage in a transverse direction as a main shrinking direction, in a temperature range of 70-85° C., wherein the rate of change of shrinkage ratio in a main shrinking direction with respect to time within 5 sec at 95° C. upon measurement of thermal shrinkage-force in a predetermined longitudinal direction using a thermal stress tester is 4.0-10.0%/sec.

27. A thermo-shrinkable polyester film having a velocity of shrinkage of 0.5-3.5%/° C. in a transverse direction as a main shrinking direction, as represented by Equation 1 below:

$$\text{Velocity of Shrinkage} = \Delta L / \Delta T \qquad \text{Equation 1}$$

wherein the equation is obtained by measuring dimension changes of a sample due to expansion and shrinkage depending on changes in temperature using a linear variable differential transformer, in which $\Delta T$ is a change in temperature and $\Delta L$ is a deformation percentage in a transverse direction as a main shrinking direction, in a temperature range of 70-85° C., wherein the thermo-shrinkable polyester film has a maximum shrinkage temperature of 85-100° C. in a main shrinking direction and a maximum shrinkage stress of 0.65-1.30 kg/mm² in a main shrinking direction, in which the maximum shrinkage temperature is defined as, on the graph of shrinkage stress versus temperature obtained by measuring stress of a film which is held under conditions of room temperature and a predetermined initial load (0.125 kg/mm²)and is shrunk due to application of heat thereto at a predetermined heating rate (2.5° C./sec), a first temperature showing the maximum shrinkage stress, and the maximum shrinkage stress is defined as a peak of the graph of shrinkage stress versus temperature obtained by measuring stress of a film which is held under conditions of room temperature and a predetermined initial load (0.125 kg/mm²) and is shrunk due to application of heat thereto at a predetermined heating rate (2.5° C./sec).

28. A thermo-shrinkable polyester film having a velocity of shrinkage of 0.5-3.5%/° C. in a transverse direction as a main shrinking direction, as represented by Equation 1 below:

$$\text{Velocity of Shrinkage} = \Delta L / \Delta T \qquad \text{Equation 1}$$

wherein the equation is obtained by measuring dimension changes of a sample due to expansion and shrinkage depending on changes in temperature using a linear variable differential transformer, in which $\Delta T$ is a change in temperature and $\Delta L$ is a deformation percentage in a transverse direction as a main shrinking direction, in a temperature range of 70-85° C., wherein the thermo-shrinkable polyester film has a dynamic glass transition temperature of 90-100° C. in a main shrinking direction as measured through dynamic mechanical thermal analysis and an intrinsic viscosity of 0.60-0.70 dl/g.

29. A thermo-shrinkable polyester film having a velocity of shrinkage of 0.5-3.5%/° C. in a transverse direction as a main shrinking direction, as represented by Equation 1 below:

$$\text{Velocity of Shrinkage} = \Delta L / \Delta T \qquad \text{Equation 1}$$

wherein the equation is obtained by measuring dimension changes of a sample due to expansion and shrinkage depending on changes in temperature using a linear variable differential transformer, in which ΔT is a change in temperature and ΔL is a deformation percentage in a transverse direction as a main shrinking direction, in a temperature range of 70-85° C., wherein the thermo-shrinkable polyester film has a rate of shrinkage deformation of 3.5-8.5 in a transverse direction as a main shrinking direction as represented by Equation 2 below:

$$\text{Rate of Shrinkage Deformation} = dL/dT \qquad \text{Equation 2}$$

wherein the value is obtained by differentiating the deformation percentage in a transverse direction as a main shrinking direction depending on the change in temperature in a temperature range of 30-90° C. as represented by Equation 1 showing dimension changes of a sample due to expansion and shrinkage depending on changes in temperature measured using a linear variable differential transformer, and indicates a maximum rate of deformation in the temperature range.

30. A thermo-shrinkable polyester film having a velocity of shrinkage of 0.5-3.5%/° C. in a transverse direction as a main shrinking direction, as represented by Equation 1 below:

$$\text{Velocity of Shrinkage} = \Delta L/\Delta T \qquad \text{Equation 1}$$

wherein the equation is obtained by measuring dimension changes of a sample due to expansion and shrinkage depending on changes in temperature using a linear variable differential transformer, in which ΔT is a change in temperature and ΔL is a deformation percentage in a transverse direction as a main shrinking direction, in a temperature range of 70-85° C., wherein the thermo-shrinkable polyester film has a thermal shrinkage ratio of 60% or more (at 95° C., 10 sec, free state) in a transverse direction as a main shrinking direction.

* * * * *